United States Patent
Safarik

(10) Patent No.: US 9,454,154 B1
(45) Date of Patent: Sep. 27, 2016

(54) INCIDENT LIGHT SENSOR ON AUTONOMOUS VEHICLE

(71) Applicant: Amazon Technologies, Inc., Seattle, WA (US)

(72) Inventor: Stephen Thomas Safarik, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/063,136

(22) Filed: Mar. 7, 2016

(51) Int. Cl.
   *B64C 19/00* (2006.01)
   *G05D 1/00* (2006.01)
   *B64C 39/02* (2006.01)
   *H04N 5/235* (2006.01)
   *H04N 5/247* (2006.01)

(52) U.S. Cl.
   CPC ............ *G05D 1/0088* (2013.01); *B64C 39/024* (2013.01); *H04N 5/2353* (2013.01); *H04N 5/247* (2013.01); *B64C 2201/108* (2013.01); *B64C 2201/123* (2013.01); *B64C 2201/141* (2013.01)

(58) Field of Classification Search
   CPC .............. G05D 1/0088; B64C 39/024; B64C 2201/108; B64C 2201/123; B64C 2201/141; H04N 5/2352; H04N 5/247

USPC ............................................................ 701/3
See application file for complete search history.

(56) References Cited

U.S. PATENT DOCUMENTS

| 8,937,675 B2 * | 1/2015 | Noori ................ H04M 1/72522 348/333.02 |
| 2009/0315722 A1 * | 12/2009 | Hou ..................... G08B 17/125 340/578 |

OTHER PUBLICATIONS

Introduction to Light Meters. [online]. B&H Foto and Electronics Corp, Feb. 24, 2016 [retrieved on Feb. 24, 2016]. Retrieved from the Internet: <URL:http://www.bhphotovideo.com/find/Product_Resources/lightmeters1.jsp>.

* cited by examiner

*Primary Examiner* — Richard Camby
(74) *Attorney, Agent, or Firm* — Kilpatrick Townsend & Stockton LLP

(57) ABSTRACT

An incident light meter on an autonomous vehicle receives ambient light and outputs an incident light measurement in response the ambient light. One or more image sensors of the autonomous vehicle image the environment of the autonomous vehicle. An exposure setting is generated at least in part on the incident light measurement. The one or more image sensors capture a digital image at the exposure setting.

21 Claims, 7 Drawing Sheets

INCIDENT LIGHT SENSOR ON AUTONOMOUS VEHICLE

BACKGROUND

Autonomous vehicles including ground-based autonomous vehicles and unmanned aerial vehicles (UAVs) are developed for use in a variety of contexts. Autonomous vehicles are being used in retail and commercial contexts, for example. An autonomous vehicle is generally able to sense its environment and navigate in that environment without human input. Some autonomous vehicles include sensors for navigation purposes.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods of using an incident light meter on an autonomous vehicle to aid in imaging are described herein. Example autonomous vehicles include ground-based autonomous vehicles and unmanned aerial vehicles (UAVs). An incident light sensor on the autonomous vehicle allows for more accurate exposure setting of cameras of the autonomous vehicle. This may help improve the picture quality captured by the camera(s) of the autonomous vehicle.

Conventionally, exposure settings (auto exposure) for cameras are determined using "through the lens" metering commonly known as "TTL." However, TTL metering is based on reflected light. In some environments, TTL metering may lead to undesirable results. For example, in a snowy environment, TTL metering results in exposure settings that yield an image that is approximately grey.

In accordance with at least one embodiment of the disclosure, an incident light measurement is taken by an incident light meter on an autonomous vehicle. An exposure setting is determined based at least in part on the incident light measurement. The cameras of the autonomous vehicle may capture image(s) at the exposure setting.

In accordance with at least one embodiment of the disclosure, a UAV includes an incident light meter and one or more cameras. The UAV is using the cameras to assist in navigation. The UAV may be navigating to a location to drop off a package that a user ordered, for example. Using the incident light meter to generate exposure settings for the camera(s) of the UAV allows the UAV to better image the environment surrounding the UAV and thus determine more accurately where to drop off the package for the user. Additionally, using an incident light meter may generate a suitable exposure setting for the cameras faster and/or utilize fewer processor resources than conventional auto-exposure processes. In selected embodiments, if a suitable exposure setting cannot be obtained, the UAV may be re-positioned to an alternative location where the incident light measurement may allow an improved exposure setting to be obtained.

Figure 1:
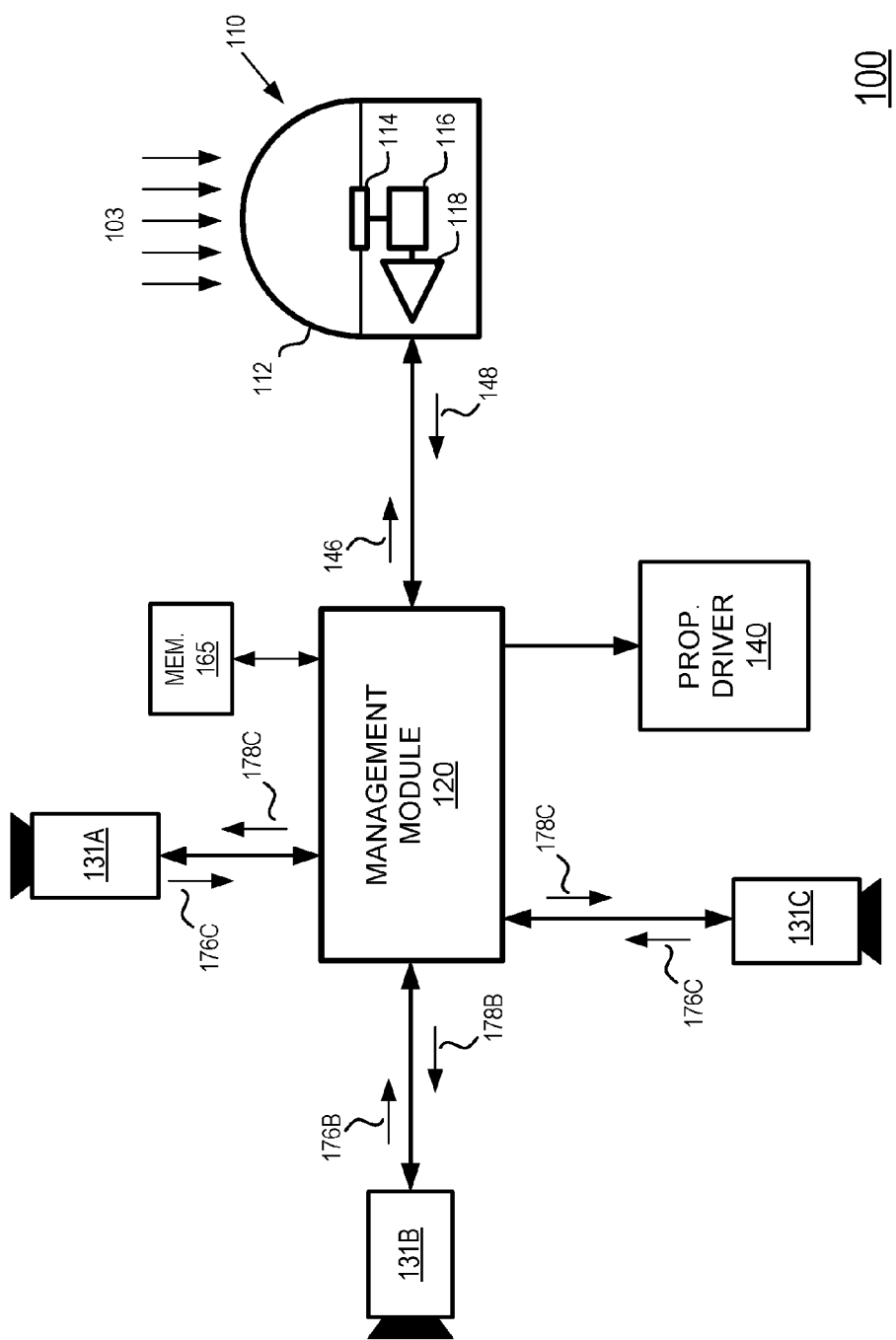
FIG. 1 illustrates a block-diagram system that includes an incident light meter that may be included in an autonomous vehicle.

FIG. 1 illustrates a system 100 that may be included in an autonomous vehicle. System 100 includes an incident light meter 110, management module 120, an array of cameras 131, memory 165, and a propulsion driver 140. Incident light meter 110 may be positioned on a top of an autonomous vehicle to measure the incident visible light 103. Incident visible light 103 may originate from the sun, the moon, or street lighting, for example.

Incident light meter 110 includes a photosensitive element 114 to measure the incident visible light 103 of an ambient environment. In one embodiment, the photosensitive element 114 includes a photodiode. A visible light filter that passes visible light while blocking non-visible light (e.g. ultraviolet, near-infrared, and infrared) may be placed over the photosensitive element 114 so that only visible light is measured. In one embodiment, a filter is not placed over photosensitive element 114 and the photosensitive element 114 is exposed to ultraviolet, visible, near-infrared, and infrared light. Diffusive dome 112 may also be included in incident light meter 110 to receive and diffuse the incident visible light 103 to contribute to more accurate readings for incident light meter 110. Photosensitive element 114 generates a signal corresponding to the intensity of the incident light 103. That signal may be filtered by filter block 116 and amplified by amplifier 118. The amplified analog signal may be outputted from the incident light meter to management module 120 as incident light measurement 148. Alternatively, the amplified analog signal may be converted to a digital value by an ADC (analog-to-digital converter) of the incident light meter 110. The digital value may then be converted to a measurement value such as lux, which is a unit of illuminance. The lux measurement value may then be outputted as a digital value to management module 120 as incident light measurement 148, in some implementations. Incident light meter 110 may output its incident light measurement 148 periodically (e.g. every 10 ms) or it may output incident light measurement 148 on request. When incident light measurement 148 is outputted on request, management module 120 may send a request command 146 to incident light meter 110 to receive incident light measurement 148.

Management module 120 receives the incident light measurement 148 from incident light meter 110. In implementations where incident light measurement 148 is received by management module 120 as an analog signal, management module may have an on-board ADC to convert the analog signal to a digital value. In one implementation where incident light measurement 148 is a digital value, the incident light measurement 148 is sent to management module 120 via a serial bus. Management module 120 may include a processing logic such as a processor, microprocessor, FPGA, or otherwise. Management module 120 may include multiple processing cores. Management module 120 is communicatively coupled to memory 165, in FIG. 1. In one embodiment, management module 120 includes on-board memory. Computer-executable instruction, software or firmware implementations of the management module 120 may include computer-executable or machine-executable instructions written in any suitable programming language to perform the various functions described herein. Memory 165 may store program instructions that are loadable and executable on management module 120. Memory 165 may be volatile (such as random access memory (RAM)) and/or non-volatile (such as read-only memory (ROM), flash memory, or other memory).

Management module 120 is communicatively coupled to one or more cameras 131. In the illustrated embodiment, management module 120 is communicatively coupled to three cameras, 131A, 131B, and 131C. However, management module 120 may be communicatively coupled to many more cameras 131 than are illustrated in FIG. 1. Management module 120 generates an exposure setting for cameras 131 based at least in part on receiving incident light measurement 148. Management module 120 may access a lookup table that has exposure values that correspond to incident light measurement values, for example. Management module 120 may also perform a calculation to generate the exposure setting.

Example exposure settings include gain (a.k.a. ISO), shutter speed (a.k.a. exposure period for digital shutters), and aperture. A high incident light measurement 148 value (e.g. 100,000 lux) may correspond with a "fast" shutter speed (e.g. 5 ms), while a low incident light measurement 148 value (e.g. 5 lux) may correspond with a "slow" shutter speed (e.g. 250 ms). Similarly, a high incident light measurement 148 value may correspond with a low gain, while a low incident light measurement 148 value may correspond with a high gain. For aperture, a large aperture may correspond with a low incident light measurement 148 value while a small aperture may correspond with a high incident light measurement 148 value.

Once the exposure setting is generated by management module 120, it can be sent to one or more cameras 131 as exposure setting 178. In one implementation, exposure setting 178 is sent to every camera coupled to management module 120. In one implementation, exposure setting 178 is only sent to select cameras coupled to management module 120. Cameras 131 may each include a digital image sensor. The digital image sensor in cameras 131 may be a CMOS (Complimentary Metal-Oxide-Semiconductor) image sensor. The digital image sensor in cameras 131 may be a CCD (charge-coupled device). Cameras 131 may utilize a digital shutter (e.g. rolling shutter or global shutter) or utilize a mechanical shutter. The digital image captured by the camera 131 at the exposure setting 178 is sent to management module 120. Management module 120 may analyze the image and adjust a propulsion system of an autonomous vehicle in response to analyzing the digital image. In one embodiment, the digital image includes a target landing area and the management module 120 adjusts the propulsion system of a UAV to center the target landing area under the camera 131 that captured the digital image at the exposure setting. In FIG. 1, management module 120 sends propulsion commands to propulsion driver 140. In one embodiment, propulsion driver 140 drives electric motors that rotate propellers of a UAV.

Figure 2:
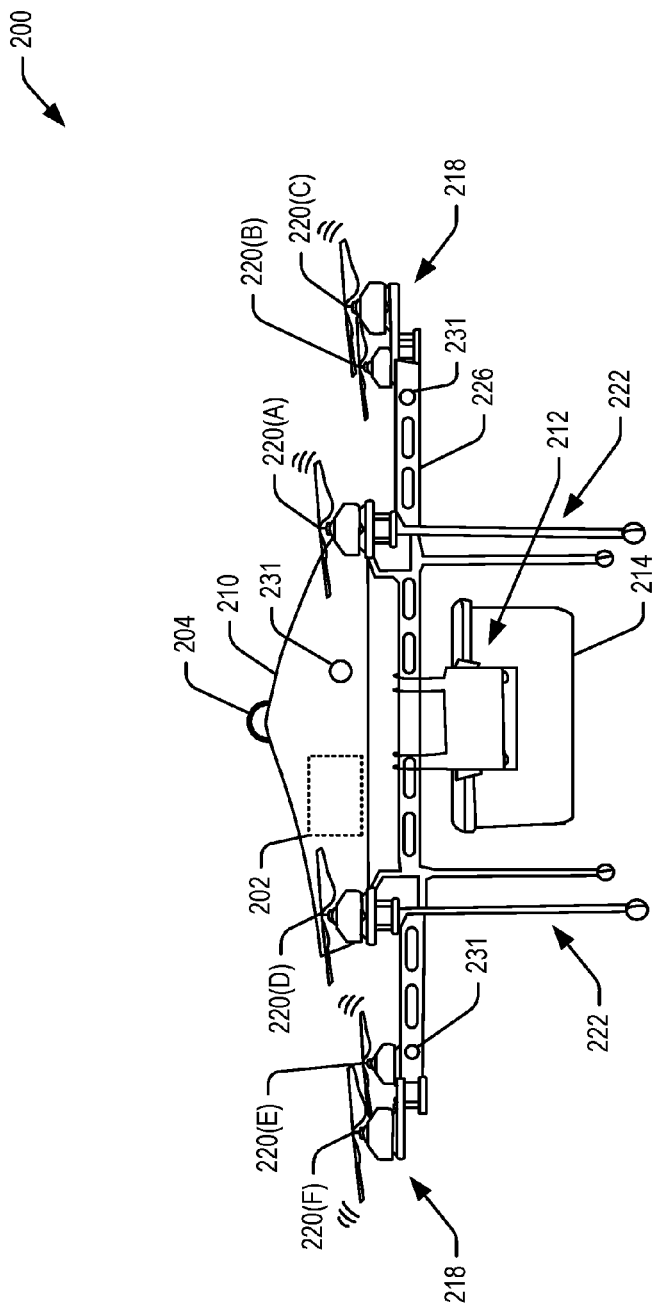
FIG. 2 illustrates an example UAV as one example of an autonomous vehicle.

FIG. 2 illustrates an example UAV 200 that may include system 100. UAV 200 may be designed in accordance with commercial aviation standards and may include multiple redundancies to ensure reliability. For purposes of this specification, the UAV 200 may include a plurality of systems or subsystems operating under the control of, or at least partly under the control of, a management system 202. The management system 202 may include an onboard computer for autonomously or semi-autonomously controlling and managing the UAV 200. In one embodiment, the on-board computer of management system 202 serves as management module 120. Portions of the management system 202, including the onboard computer, may be housed under top cover 210. As used herein, the management system 202 may include a power supply and assemblies (e.g., rechargeable battery, liquid fuel, and other power supplies) (not shown), one or more communications links and antennas (e.g., modem, radio, network, cellular, satellite, and other links for receiving and/or transmitting information) (not shown), one or more navigation devices and antennas (e.g., global positioning system (GPS), inertial navigation system (INS), range finder, Radio Detection And Ranging (RADAR), and other systems to aid in navigating the UAV 200 and detecting objects) (not shown), radio-frequency identification (RFID) capability (not shown), and interfaces capable of speech interpretation and recognition (not shown).

As shown in FIG. 2, the UAV 200 may also include a retaining system 212. The retaining system 212 may be configured to retain a payload 214, which may be a package for delivering to a user. The UAV 200 may deliver the payload 214 by fully landing on the ground and releasing the retaining system 212. Cameras 231 may be positioned on top cover 210 or on the frame 226 of UAV 200. Although not shown, one or more cameras 231 may be mounted as down-ward looking cameras to identify a landing zone for payload 214 while UAV 200 is in flight.

Further, UAV 200 includes propulsion system 218. In some examples, the propulsion system 218 may include rotary blades or otherwise be a propeller-based system. The propulsion driver 140 of FIG. 1 may drive electric motors that rotate propellers of the propulsion system, in one embodiment. In some examples, the propulsion system 218 may include or be associated with one or more fixed wings. As illustrated in FIG. 2, the propulsion system 218 may include a plurality of propeller devices, a few of which, 220(A)-220(F), are shown in this view. Each propeller device may include one propeller, a motor, wiring, a balance system, a control mechanism, and other features to enable flight. In some examples, the propulsion system 218 may operate at least partially under the control of the management system 202. In some examples, the propulsion system 218 may be configured to adjust itself without receiving instructions from the management system 202. Thus, the propulsion system 218 may operate semi-autonomously or autonomously. The propulsion system 218 may enable multi-directional flight of the UAV 200 (e.g., by adjusting each propeller device individually). The UAV 200 may also include landing structure 222. The landing structure 222 may be adequately rigid to support the UAV 200 and the payload 214. The landing structure 222 may include a plurality of elongated legs which may enable the UAV 200 to land on and take off from a variety of different surfaces. The plurality of systems, subsystems, and structures of the UAV 200 may be connected via frame 226. The frame 226 may be constructed of a rigid material and be capable of receiving via different connections the variety of systems, sub-systems, and structures. For example, the landing structure 222 may be disposed below the frame 226 and, in some examples, may be formed from the same material and/or same piece of material as the frame 226. The propulsion system 218 may be disposed radially around a perimeter of the frame 226 or otherwise distributed around the frame 226.

Figure 3:
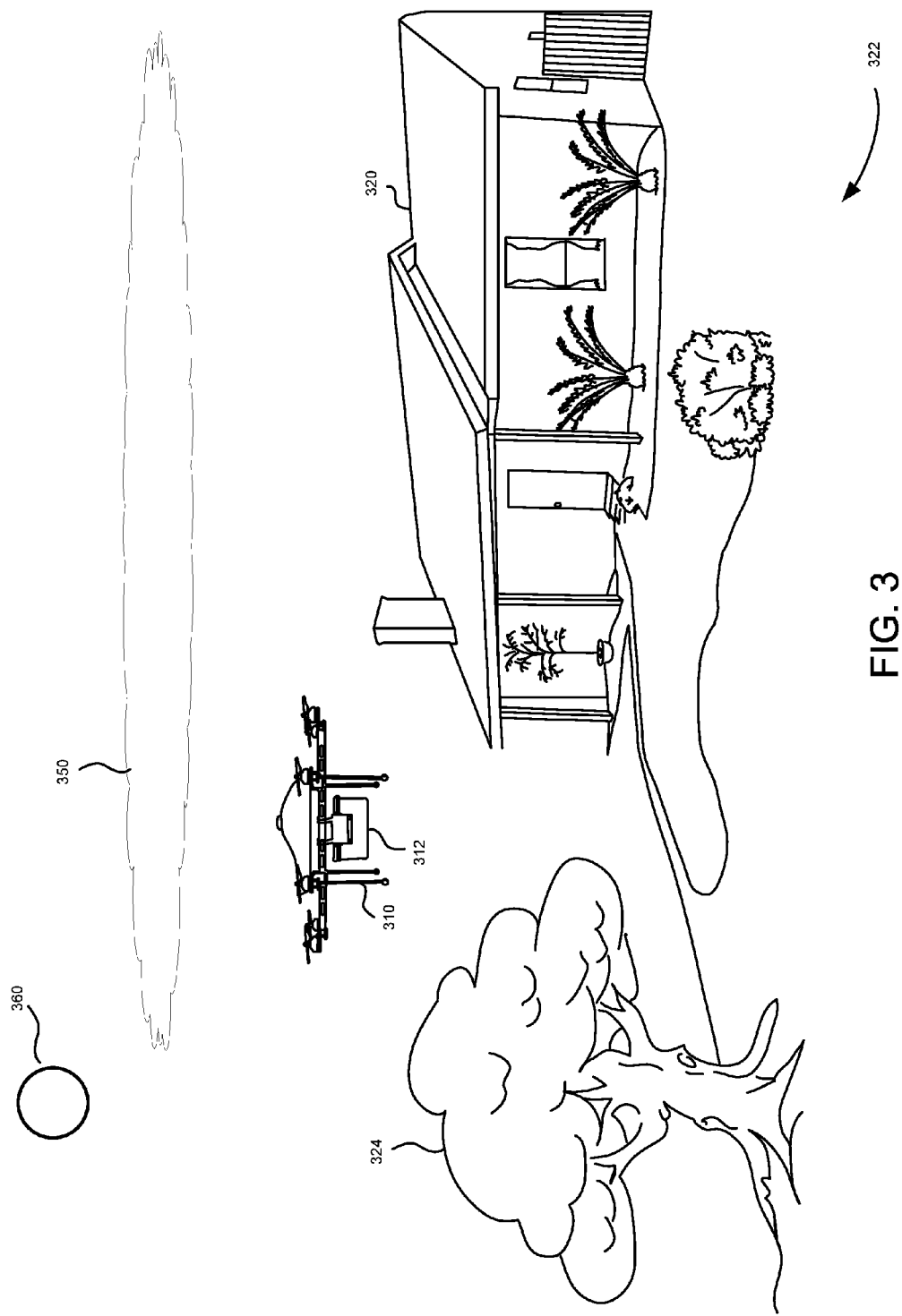
FIG. 3 illustrates an example environment that an autonomous vehicle may encounter.

FIG. 3 illustrates an example environment that an autonomous vehicle may encounter. In the illustrated embodiment, FIG. 3 includes a UAV 310 carrying a package 312 to be delivered to a location 320. FIG. 3 also includes a surface 322 and an obstacle 324. UAV 310 may be deployed to a location 320 associated with a user to deliver package 312. In this example environment, the location 320 is shown as a dwelling of the user. However, the embodiments described herein are not limited as such and may similarly apply to other types of locations and/or other associations to the user. FIG. 3 further includes a sun 360 and one or more clouds 350. The orientation of the sun 360 and clouds 350 (or lack of clouds) may affect the lighting of the illustrated environment.

As UAV 310 navigates through an environment, the incident light falling on a scene that is being imaged by cameras of UAV 310 may change. Cloud(s) 350 may block the sun 360 and drastically reduce the incident light incident on the environment. Additionally, navigating beside or under an obstacle 324 may also block the sun 360 from shining directly on a scene imaged by UAV 310, which may reduce the incident light of the scene. Including an incident light meter 110 on UAV 310 to set the exposure settings of cameras 131 will render more accurate colors and more accurately capture the highlights and shadows of the imaged scene. Where navigation of UAV 310 is concerned, capturing more accurate images allows for better identification of a target landing zone, for example. When the incident light changes, incident light meter 110 may also quickly determine this and pass the incident light measurement to management module 120 for distribution to cameras 131. In contrast, conventional auto-exposure algorithms that are based on reflected light may be "confused" by sudden light changes and thus take longer in homing in on an exposure setting for a camera. Furthermore, having each camera capture images at the same exposure may save processing steps when multiple images are analyzed for navigation purposes.

In one example, a user may have operated a computing device to access a network-based resource to order an item. Based on this order, the item may be packaged at a facility and loaded on the UAV 310. The UAV 310 may be remotely controlled or autonomously operated to fly the package 312 from the facility to the location 320, deliver the package 312, and return to the facility or to some other location. These operations of the UAV 310 may represent an example mission that the UAV 310 may be deployed to perform.

Upon arrival to the location 320 (e.g., to the exact location 320 or to a vicinity thereof), the UAV 310 may determine a delivery surface 322 to deliver the package 312. FIG. 3 illustrates the delivery surface 322 as a surface of a backyard of the user's dwelling. However, the embodiments described herein are not limited as such and may similarly apply to other types of surfaces and/or other associations to location 320.

Various techniques may be used to determine the surface 322. In one example technique, data about the surface 322, such as spatial coordinates, may be provided to the UAV 310 (e.g., transmitted thereto and stored thereat) prior to leaving the facility, on the way to the location 320, upon or after arrival to the location 320. In another example technique, this data may be generated based on sensors of the UAV 310. For instance, the UAV 310 may be equipped with a number of sensors, such as imaging, motion, radio frequency, and/or other sensors and one or more processing units to sense and process environmental data associated with the location and generate the data about the surface 322. Of course, a combination of both example techniques may be used. Cameras 131 are examples of sensors that may be used to determine an appropriate landing area on surface 322.

The data about the surface, whether received from a remote source and/or locally generated by the UAV 310, may include identifiers of, for example, an obstacle 324 when such obstacle and introduce may exist on or in the vicinity of the surface 322. The obstacle 324 may represent an object that may be static, such as a tree or fence, or that may be moving, such as a wind turbine.

Figure 4:
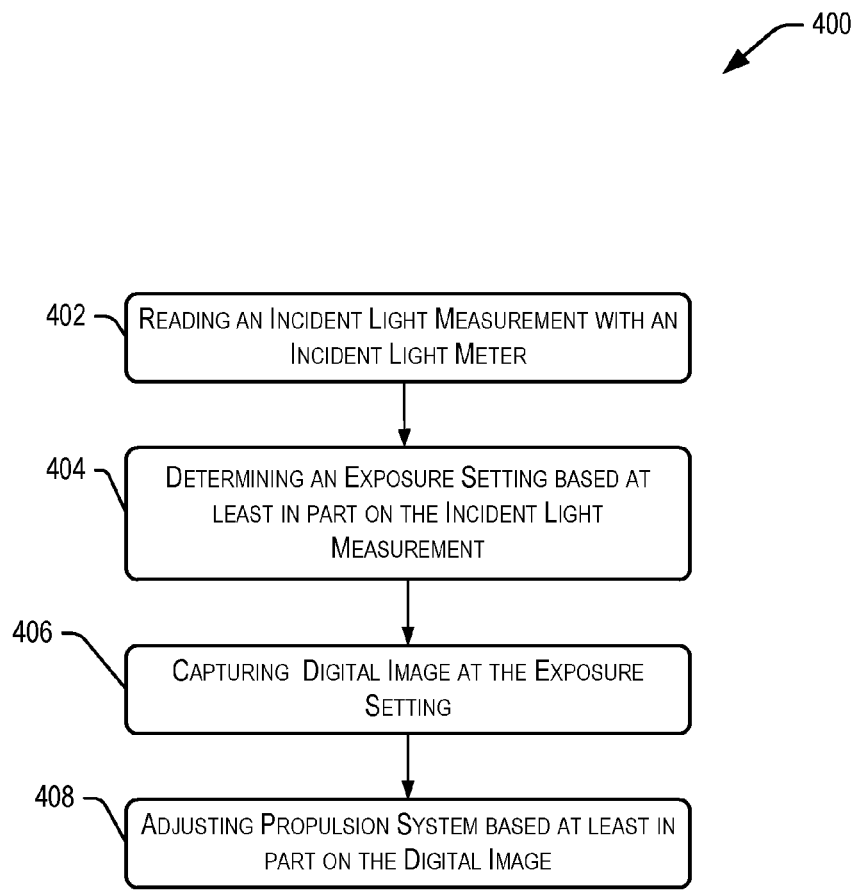
FIG. 4 illustrates an example process of utilizing an incident light meter on an autonomous vehicle.

FIG. 4 illustrates an example process 400 of utilizing an incident light meter on an autonomous vehicle. The process 400 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein. In accordance with at least one embodiment, the process 400 of FIG. 4 may be performed by system 100. Computer executable instructions for performing at least a portion of process 400 may be stored in memory 165.

In process block 402, an incident light measurement is read with an incident light meter (e.g. incident light meter 110). An exposure setting is determined based at least in part on the incident light measurement in process block 404. Processing logic (e.g. management module 120) may determine the exposure setting, in one implementation. Determining the exposure setting may include accessing a lookup table that has exposure values that correspond to incident light measurement values, for example. Alternatively, the incident light measurement may be inputted into an equation and a calculation may be performed to generate the exposure setting.

In process block 406, a digital image is captured by at least one digital image sensor of the autonomous vehicle. In one example, the autonomous vehicle includes a plurality of digital image sensors, but not all of the digital image sensors receive the exposure setting. In one example, processing logic sends the exposure setting to a first portion of the image sensors in the plurality of image sensors but not to a remaining portion of the image sensors in the plurality of digital image sensors.

In process block 408, a propulsion system is adjusted based at least in part on the at least one digital image captured at the exposure setting. The propulsion system may also be adjusted based at least in part on a GPS coordinate, for example. If the autonomous vehicle is a ground-based vehicle, adjusting the propulsion system may include increasing or decreasing the speed of the wheels or tread/tracks of the autonomous vehicle. Adjusting the propulsion system may also include steering the wheels or tread/tracks of a ground-based autonomous vehicle. If the autonomous vehicle is a UAV, adjusting the propulsion system may include adjusting a rotation speed of one or more propellers of the propulsion system.

In one embodiment, processing logic (e.g. management module 120) may analyze the digital image and adjust the propulsion system of an autonomous vehicle in response to analyzing the digital image. In one embodiment, the digital image includes a target landing area and the processing logic adjusts the propulsion system of a UAV to center the target landing area under a camera that captured the digital image at the exposure setting.

Figure 5:
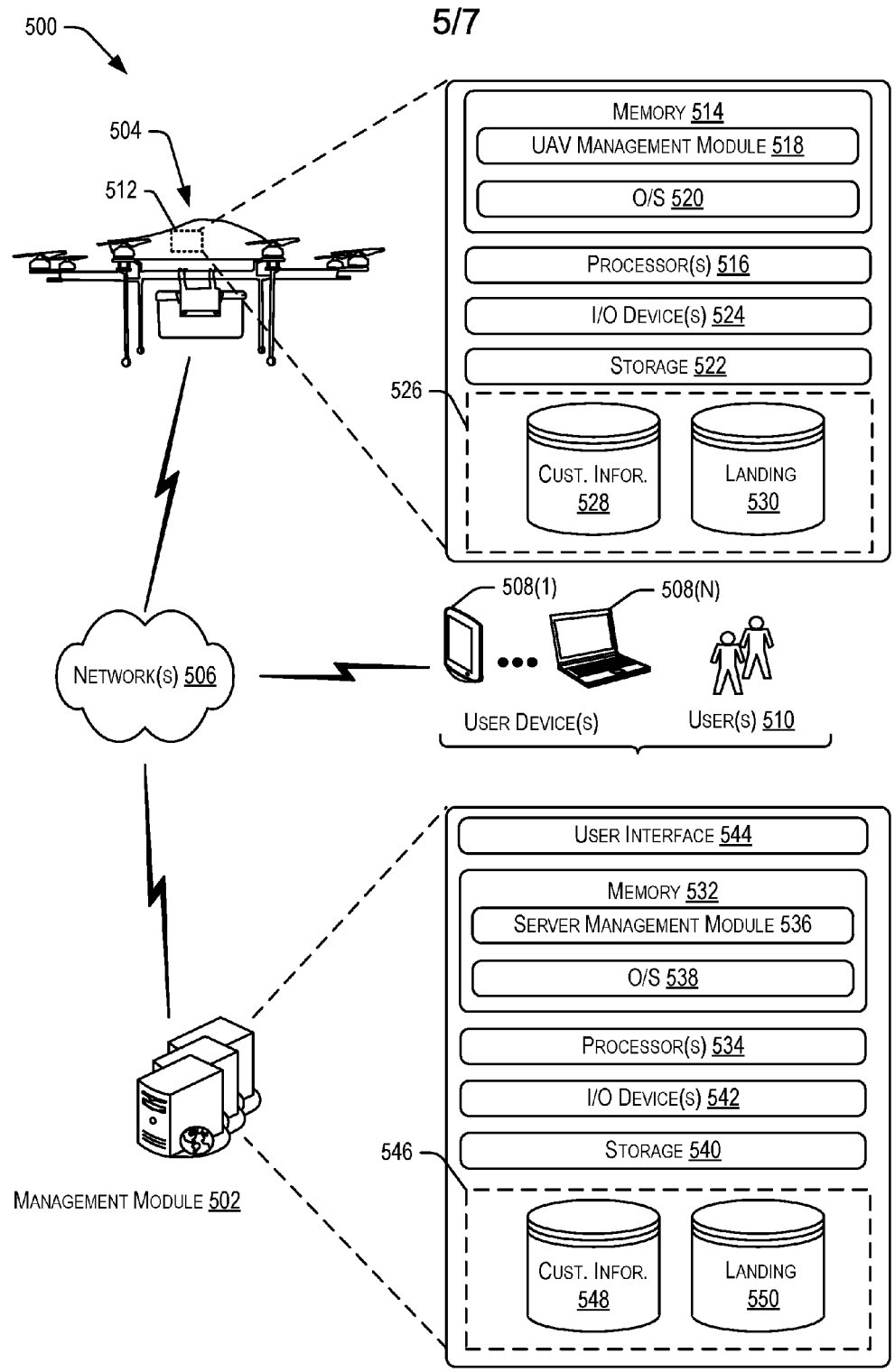
FIG. 5 illustrated an example schematic architecture for using a UAV for delivering packages.

Turning next to FIG. 5, in this figure is illustrated an example schematic architecture 500 for using UAV 504 for delivering packages, according to at least one example. The architecture 500 may include a management module 502. The management module 502 may be included as part of an electronic marketplace (not shown) and interface with purchase and delivery services of the electronic marketplace. In this manner, the management module 502 may coordinate delivery of items via UAVs, such as UAV 504, to customers of the electronic marketplace. The UAV 504 is an example of the UAV 200 discussed previously. In some examples, the management module 502 may be a stand-alone service operated on its own or in connection with an electronic marketplace. In either example, the management module 502 may be in communication with the UAV 504 via one or more network(s) 506 (hereinafter, "the network 506"). The network 506 may include any one or a combination of many different types of networks, such as cable networks, the Internet, wireless networks, cellular networks, radio networks, and other private and/or public networks. Thus, the management module 502 may be configured to provide back-end control of the UAV 504 prior to, during, and after completion of its delivery plan. As discussed previously, in some examples, the UAV 504 may be configured to accomplish its delivery plan (e.g., deliver its payload) with little to no communication with the management module 502.

User devices 508(1)-508(N) (hereinafter, "the user device 508") may also be in communication with the management module 502 and the UAV 504 via the network 506. The user device 508 may be operable by one or more human users 510 (hereinafter, "the human user 510") to access the management module 502 (or an electronic marketplace) and the UAV 504 via the network 506. The user device 508 may be any suitable device capable of communicating with the network 506. For example, the user device 508 may be any suitable computing device such as, but not limited to, a mobile phone, a smart phone, a personal digital assistant (PDA), a laptop computer, a thin-client device, a tablet PC, a desktop computer, a set-top box, or other computing device. In some examples, the user device 508 may be in communication with the management module 502 via one or more web servers constituting an electronic marketplace (not shown) connected to the network 506 and associated with the management module 502.

Turning now to the details of the UAV 504, UAV 504 may include an onboard computer 512 including at least one memory 514 and one or more processing units (or processor(s)) 516. The processor(s) may serve as management module 120 and memory 514 may serve as memory 165, in some embodiments. The processor(s) 516 may be implemented as appropriate in hardware, computer-executable instructions, software, firmware, or combinations thereof. Computer-executable instruction, software or firmware implementations of the processor(s) 516 may include computer-executable or machine-executable instructions written in any suitable programming language to perform the various functions described. The memory 514 may include more than one memory and may be distributed throughout the onboard computer 512. The memory 514 may store program instructions (e.g. UAV management module 318) that are loadable and executable on the processor(s) 516, as well as data generated during the execution of these programs. Depending on the configuration and type of memory including the UAV management module 518, the memory 514 may be volatile (such as random access memory (RAM)) and/or non-volatile (such as read-only memory (ROM), flash memory, or other memory). The UAV management module 518 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 514 may include multiple different types of memory, such as static random access memory (SRAM), dynamic random access memory (DRAM), or ROM. Turning to the contents of the memory 514 in more detail, the memory 514 may include an operating system 520 and one or more application programs, modules or services for implementing the features disclosed herein including at least the UAV management module 518.

In some examples, the onboard computer 512 may also include additional storage 522, which may include removable storage and/or non-removable storage. The additional storage 522 may include, but is not limited to, magnetic storage, optical disks, and/or tape storage. The disk drives and their associated computer-readable media may provide non-volatile storage of computer-readable instructions, data structures, program modules, and other data for the computing devices.

The memory 514 and the additional storage 522, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the onboard computer 512. The modules of the onboard computer 512 may include one or more components. The onboard computer 512 may also include input/output (I/O) device(s) and/or ports 524, such as for enabling connection with a keyboard, a mouse, a pen, a voice input device, a touch input device, a display, speakers, a printer, or other I/O device. The I/O device(s) 524 may enable communication with the other systems of the UAV 504 (e.g., other parts of the control system, power system, communication system, navigation system, propulsion system, and the retaining system).

The onboard computer 512 may also include data store 526. The data store 526 may include one or more databases, data structures, or the like for storing and/or retaining information associated with the UAV 504. In some examples, the data store 526 may include databases, such as customer information database 528 and landing zone database 530. Within the customer information database 528 may be stored any suitable customer information that may be used by the UAV 504 in implementing and/or affecting its delivery plan. For example, the customer information database 528 may include profile characteristics for the human user 510. The profile characteristics may include a shipping address. The landing zone database 530 may store suitable landing zones or drop-off zones associated with a particular user. The landing zone database 530 may include GPS coordinates and/or images of landing zones associated with a particular user.

Turning now to the details of the user device 508. The user device 508 may be used by the human user 510 for interacting with the management module 502. The user device 508 may therefore include a memory, a processor, a user-interface, a web-service application, and any other suitable feature to enable communication with the features of architecture 500. The web service application may be in the form of a web browser, an application programming interface (API), virtual computing instance, or other suitable application. In some examples, when the management module 502 is part of, or shares an association with, an electronic marketplace, the user device 508 may be used by the human user 510 for procuring one or more items from the electronic marketplace. The human user 510 may request delivery of the purchased item(s) using the UAV 504, or the management module 502 may coordinate such delivery on its own.

The management module 502 may include one or more service provider computers, perhaps arranged in a cluster of servers or as a server farm, and may host web service applications. These servers may be configured to host a website (or combination of websites) viewable via the user device 508. The management module 502 may include at least one memory 532 and one or more processing units (or processor(s)) 534. The processor(s) 534 may be implemented as appropriate in hardware, computer-executable instructions, software, firmware, or combinations thereof. Computer-executable instruction, software or firmware implementations of the processor(s) 534 may include computer-executable or machine-executable instructions written in any suitable programming language to perform the various functions described. The memory 532 may include more than one memory and may be distributed throughout the management module 502. The memory 532 may store program instructions (e.g., server management module 536) that are loadable and executable on the processor(s) 534, as well as data generated during the execution of these programs. Depending on the configuration and type of memory including the server management module 536, the memory 532 may be volatile (such as random access memory (RAM)) and/or non-volatile (such as read-only memory (ROM), flash memory, or other memory). The management module 502 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 532 may include multiple different types of memory, such as static random access memory (SRAM), dynamic random access memory (DRAM), or ROM. Turning to the contents of the memory 532 in more detail, the memory 532 may include an operating system 538 and one or more application programs, modules or services for implementing the features disclosed herein including at least the server management module 536. The server management module 536, in some examples, may function similarly to the UAV management module 518. For example, when the UAV 504 is in network communication with the management module 502, the UAV 504 may receive at least some instructions from the management module 502 as the server management module 536 is executed by the processors 534. In some examples, the UAV 504 executes the UAV management module 518 to operate independent of the management module 502.

In some examples, the management module 502 may also include additional storage 540, which may include removable storage and/or non-removable storage. The additional storage 540 may include, but is not limited to, magnetic storage, optical disks, and/or tape storage. The disk drives and their associated computer-readable media may provide non-volatile storage of computer-readable instructions, data structures, program modules, and other data for the computing devices.

The memory 532 and the additional storage 540, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the management module 502. The modules of the management module 502 may include one or more components. The management module 502 may also include input/output (I/O) device(s) and/or ports 542, such as for enabling connection with a keyboard, a mouse, a pen, a voice input device, a touch input device, a display, speakers, a printer, or other I/O device.

In some examples, the management module 502 may include a user interface 544. The user interface 544 may be utilized by an operator, or other authorized user to access portions of the management module 502. In some examples, the user interface 544 may include a graphical user interface, web-based applications, programmatic interfaces such as application programming interfaces (APIs), or other user interface configurations. The management module 502 may also include data store 546. The data store 546 may include one or more databases, data structures, or the like for storing and/or retaining information associated with the management module 502. The data store 546 may include databases, such as customer information database 548 and landing zone database 550. The customer information database 548 and the landing zone database 550 may include similar information as the customer information database 528 and the landing zone database 530 of the onboard computer 512. The management module 502 may store a larger amount of information in the data store 546 than the onboard computer 512 is capable of storing in the data store 526. Thus, in some examples, at least a portion of the information from the databases in the data store 546 is copied to the databases of the data store 526, e.g., periodically, occasionally, in connection with an event, or otherwise. In this manner, the data store 526 may have up-to-date information, without having to maintain the databases. In some examples, this information may be transferred as part of a delivery plan prior to the UAV 504 beginning a delivery mission.

Figure 6:
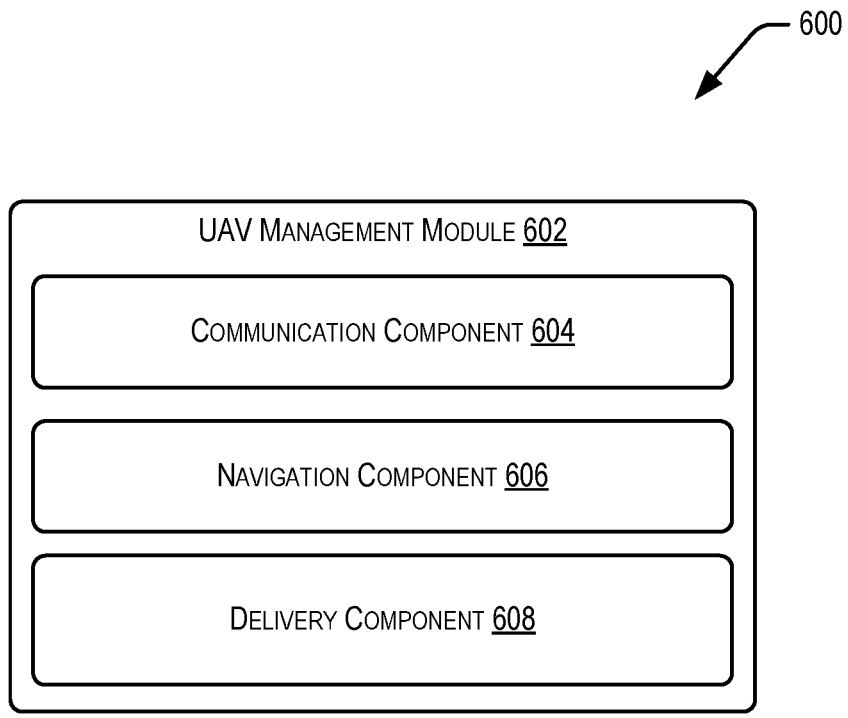
FIG. 6 illustrates an example schematic that includes a UAV management module.

Turning next to the details of the UAV management module 518 stored in the memory 514 of the onboard computer 512, in FIG. 6, example schematic device 600 is illustrated including UAV management module 602. The UAV management module 602 is an example of the UAV management module 518 and the server management module 536. The UAV management module 602 will be described from the reference point of an example UAV, but its function is not limited to controlling a UAV. The UAV management module 602 may be configured to manage one or more sub-modules, components, and/or services directed to embodiments disclosed herein. In some examples, the UAV management module 602 may include a communication component 604, a navigation component 606, and a delivery component 608. While these modules and components are illustrated in FIG. 6 and will be described as performing discrete tasks, it is understood that FIG. 6 illustrates example configurations and other configurations performing other tasks and/or similar tasks as those described herein may be implemented according to the techniques described herein. Other modules (not shown) may perform the same tasks as the UAV management module 602 or other tasks and may be implemented in a similar fashion or according to other configurations. Generally, the communication component 604 may be configured to manage communications between UAVs and a control service, between UAVs and user devices, between multiple UAVs, and/or any other communications. The navigation component 606 may be configured to implement at least portions of the delivery plan relating to navigation. For example, the navigation component 606 may calculate, adjust, receive, or determine coarse positioning or navigation instructions and fine positioning or navigation instructions. This may include, in some examples, determining trajectory adjustments to a flight path of a UAV. The delivery component 608 may be configured to implement at least portions of the delivery plan relating to item delivery. For example, the delivery component 608 may be configured to verify a human user's identity and, once verified, execute delivery of items.

Figure 7:
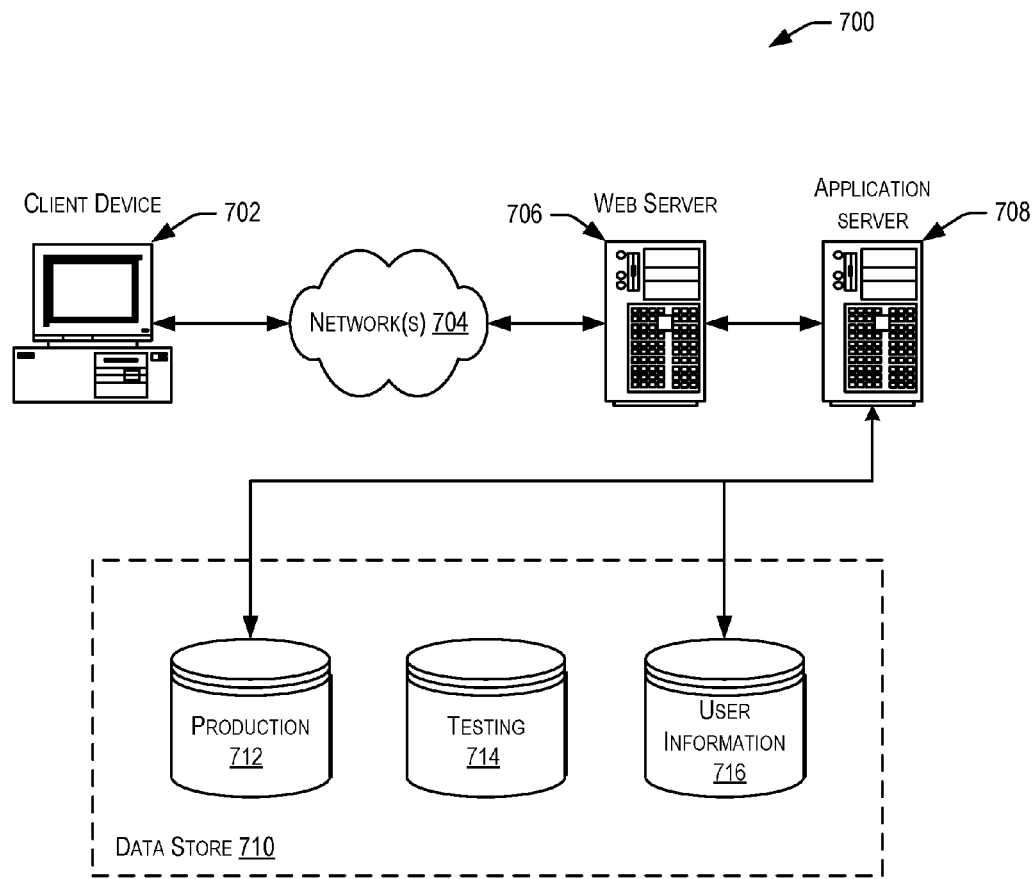
FIG. 7 illustrates an environment in which various embodiments can be implemented.

FIG. 7 illustrates aspects of an example schematic environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any suitable device operable to send and receive requests, messages or information over a suitable network 704 and convey information back to a user of the device. Examples of such client devices include personal computers, cell phones, handheld messaging devices, laptop computers, set-top boxes, personal data assistants, electronic book readers, or other client devices. The network can include any suitable network, including an intranet, the Internet, a cellular network, a local area network or any suitable such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for accessing requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes or components, which may be chained or otherwise configured, which can interact to perform tasks such as obtaining data from an appropriate data store. As used herein the term "data store" refers to any suitable device or combination of devices capable of storing, accessing and retrieving data, which may include any suitable combination and number of data servers, databases, data storage devices and data storage media, in any suitable standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the electronic client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In some examples, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the electronic client device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the environment 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of suitable applications. User or client devices can include any suitable number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of suitable commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any suitable combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation, those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any suitable method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any suitable medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An unmanned aerial vehicle (UAV), comprising:
    a frame;
    a propulsion system to generate lift, the propulsion system associated with the frame;
    an incident light meter connected to the frame and positioned to receive ambient light and configured to output an incident light measurement in response to receiving the ambient light, the incident light meter including a photosensitive element disposed beneath a diffusive dome, wherein the incident light meter is positioned on a top portion of the UAV;
    at least one image sensor connected to the frame and positioned to image an environment of the UAV; and
    a management module coupled to receive the incident light measurement from the incident light meter, wherein the management module is configured to:
        generate an exposure setting based at least in part on the incident light measurement;
        transmit the exposure setting to the at least one image sensor;
        receive a digital image from the at least one image sensor, the digital image captured at the exposure setting transmitted to the at least one image sensor; and
        generate instructions to adjust the propulsion system based at least in part on the digital image captured at the exposure setting.

2. The UAV of claim 1, wherein the exposure setting is an exposure period of the at least one image sensor.

3. The UAV of claim 1, wherein the management module is further configured to initiate the incident light measurement by sending a request command to the incident light meter.

4. The UAV of claim 1, wherein the propulsion system includes a plurality of propellers associated with the frame to generate the lift.

5. A system for an autonomous vehicle, the system comprising:
    an incident light meter positioned to receive ambient light and configured to output an incident light measurement in response to receiving the ambient light;
    at least one image sensor positioned to capture an image of an environment of the autonomous vehicle; and
    a management module coupled to receive the incident light measurement from the incident light meter, wherein the management module is configured to:
        generate an exposure setting based at least in part on the incident light measurement;
        transmit the exposure setting to the at least one image sensor; and
        receive a digital image from the at least one image sensor, the digital image captured at the exposure setting transmitted to the at least one image sensor.

6. The system of claim 5 further comprising:
    a propulsion system to move the autonomous vehicle, wherein the propulsion system is configured to be adjusted based at least in part on the digital image captured at the exposure setting.

7. The system of claim 6, wherein the autonomous vehicle is a UAV, and wherein the propulsion system includes a plurality of propellers.

8. The system of claim 6 further comprising a global positioning system (GPS) receiver, wherein the propulsion system of the autonomous vehicle is also adjusted based at least in part on a GPS coordinate received from the GPS receiver.

9. The system of claim 5, wherein the exposure setting is an exposure period of the at least one image sensor.

10. The system of claim 5, wherein the management module is further configured to initiate the incident light measurement by sending a request command to the incident light meter.

11. The system of claim 5, wherein the autonomous vehicle is a UAV, and wherein the incident light meter is positioned on a top portion of the UAV.

12. The system of claim 5, wherein the incident light meter comprises a diffusive dome and a photosensitive element positioned under the diffusive dome to receive the ambient light.

13. The system of claim 5, wherein the at least one image sensor is among a plurality of image sensors of the autonomous vehicle, and wherein the exposure setting is sent to a first portion of the image sensors in the plurality of image sensors but the exposure setting is not sent to a remaining portion of the image sensors in the plurality of image sensors.

14. The system of claim 5, wherein the at least one image sensor is included in a down-ward looking camera.

15. A method comprising:
reading an incident light measurement with an incident light meter of an autonomous vehicle;
determining an exposure setting based at least in part on the incident light measurement;
capturing at least one digital image at the exposure setting, the at least one digital image captured with an image sensor of the autonomous vehicle; and
adjusting a propulsion system of the autonomous vehicle based at least in part on the at least one digital image captured at the exposure setting.

16. The method of claim 15, wherein determining the exposure setting comprises calculating the exposure setting from an equation where the incident light measurement is an input to the equation.

17. The method of claim 15, wherein determining the exposure setting comprises accessing a look-up table that includes exposure setting entries corresponding to incident light values.

18. The method of claim 15, wherein the autonomous vehicle is an unmanned aerial vehicle (UAV), and wherein the at least one digital image comprises a target landing area and adjusting the propulsion system of the autonomous vehicle comprises causing the UAV to center the target landing area under a camera that captured the at least one digital image at the exposure setting.

19. The method of claim 15, wherein the autonomous vehicle is a UAV, and wherein the propulsion system includes a plurality of propellers for generating lift.

20. The method of claim 15, wherein the exposure setting is a gain of pixels of the image sensor.

21. The method of claim 15, wherein adjusting the propulsion system of the autonomous vehicle comprises re-positioning the autonomous vehicle and capturing a second digital image at a second incident light measurement.

* * * * *